United States Patent
Ross et al.

[19]

[11] Patent Number: 6,154,133
[45] Date of Patent: Nov. 28, 2000

[54] EXIT GUARD SYSTEM

[75] Inventors: Donald K. Ross, Olivette; Maurice V. Garoutte, Dittmer, both of Mo.; Rick D. Thomason, Worden, Ill.; David W. McGhee, DesPere, Mo.

[73] Assignee: Ross & Baruzzini, Inc., St. Louis, Mo.

[21] Appl. No.: 09/234,688

[22] Filed: Jan. 21, 1999

Related U.S. Application Data

[60] Provisional application No. 60/073,291, Jan. 22, 1998.

[51] Int. Cl.[7] ................................................. G08B 13/00
[52] U.S. Cl. ..................... 340/541; 340/905; 340/917; 340/925; 348/149; 348/153; 348/154
[58] Field of Search .................................. 340/541, 944, 340/925, 917, 933, 905, 901, 937, 429, 573.1, 540; 348/148, 149, 143, 155, 154, 153

[56] References Cited

U.S. PATENT DOCUMENTS

| | | | |
|---|---|---|---|
| 5,486,819 | 1/1996 | Horie | 340/905 |
| 5,801,618 | 9/1998 | Jenkins | 340/426 |
| 5,809,161 | 9/1998 | Auty et al. | 382/104 |

*Primary Examiner*—Edward Lefkowitz
*Assistant Examiner*—Davetta W. Goins
*Attorney, Agent, or Firm*—Peter S. Gilster; Kelly K. Burris; Greensfelder, Hemker & Gale, P.C.

[57] ABSTRACT

An exit guard system automatically detects movement of a subject along an exit path in an unauthorized direction. A first video camera is positioned for video imaging movement of a subject along the path, while a second video camera images the subject for identification. Multiple video motion detectors operate in conjunction with the first video camera to determine direction of movement of a subject along the path. A CPU operates with the video motion detectors under an exit guard program to provide a watching mode, during which frames of the second video camera are continuously grabbed and saved. Audible and/or visual alarm signaling devices are operated by the CPU in an alarm mode in response to traffic of a subject in the unauthorized direction. A video monitor displays modes of operation of the system, and control devices allow operator selection and control of modes of operation of the system. Remote access to the system for control, monitoring or other purposes is provided by data modem feature.

Method of using such system for guarding movement of a subject along the path is disclosed.

15 Claims, 5 Drawing Sheets

CONTROL CONSOLE

EXIT GUARD SYSTEM

CROSS-REFERENCE TO RELATED APPLICATION

This application is based upon Provisional Patent Application entitled Exit Guard System, Serial No.: 60/073,291, Filed: Jan. 22, 1998, of the present inventors, which is herein incorporated by reference; and continued preservation of which is requested.

BACKGROUND OF THE INVENTION

1. Field of the Invention

The invention is in the field of security control, namely preventing unauthorized entry of subjects into so-called sterile areas and other areas in which entry must be detected and denied; and more particularly, it relates to a system for automatically determining attempted entry of unauthorized personnel into sterile areas and other premises in which entry must be denied, all hereinafter referred to as "unauthorized area(s)".

2. Related Art

It has been known to use video-monitoring systems by which security personnel may observe the movements of subjects within security areas and accordingly guard exits so that unauthorized subjects may not use exits to gain access to unauthorized areas. As typically utilized, such video systems require conscientious security personnel to observe video monitors continuously. These personnel must be of sufficient attentiveness and efficiency as promptly to carry-out security measures in the event of an attempted entry into an unauthorized area protected by such a video monitoring system. For example, when security personnel were to visually observe, or use video-monitoring systems to visually observe, a busy pedestrian concourse, an almost impossible degree of watchfulness is required to absolutely assure that no subject may gain entry into an unauthorized area.

Such a problem is greatly increased in situations where subjects may be permitted to pass in one direction, i.e., for exiting a corridor or concourse, but where movement of subjects in the reverse direction is not permitted.

It has also heretofore been proposed to utilize laser beam and other electronic and mechanical detectors to monitor movement through controlled premises for the purpose of determining unauthorized entry. However, the use of such devices is compromised where subjects are permitted to move in one direction but not in the reverse direction. Where subjects may move in an exiting direction along a corridor or concourse toward and through an exit, it is desired to be able to guard such an exit against unauthorized entry.

It is desired, accordingly, to provide a movement control and exit guard system which is capable of automatically detecting unauthorized movement or entry with a high degree of security and reliability, and to provide such a system which operates electronically under computer supervision, while also providing alarm initiation and video recordation of an unauthorized entry attempt or incident.

SUMMARY OF THE INVENTION

Among the several objects and advantages of the system may be noted the provision of a movement control and exit guard system which automatically detects unauthorized movement or entry of subjects, as through an exit, with a high degree of security and reliability; the provision of such a system which operates electronically under computer supervision; which automatically provides alarm initiation upon detection of an unauthorized entry attempt or incident; which automatically provides video recordation of an unauthorized entry attempt or incident; the provision of such a system which monitors its own performance and signals if its performance may be jeopardized by conditions being monitored; the provision of such a system which includes various safeguards and advantageous control features; and the provision of such a system which is extremely well-suited to implementing security control programs at airports and other premises where a high degree of security is required.

The present invention as practically configured for these purposes is an exit guard system for automatically detecting unauthorized movement through the use of video motion detectors positioned for monitoring pedestrian traffic within an exit traffic lane or path, which words are used interchangeably in this description and each meaning a corridor, concourse, passageway, hall, walkway or other defined space through which it is expected pedestrian traffic may move in one direction, but is not permitted to move in the opposite direction, which is herein termed the "disallowed direction."

The system accordingly comprises one or more video cameras, at least one of which camera is used in connection with a respective video motion detector, by which the video camera will monitor exit lane traffic. The system operates in a watching mode, during which frames of a video camera are continuously grabbed; meaning electronically acquired and saved. Preferably, the last few seconds of video frames are saved during cyclic intervals of several seconds in duration, meaning that the last few seconds of video frames are always saved during repeating video watching cycles. If pedestrian traffic in the disallowed direction is detected while in the watching mode, a signal is effectively generated, as by relay contact closure. Such signaling is detected by central processing unit (CPU). The relay contact closure constitutes an alarm signal causing the CPU to transition to an alarm mode. A software program then goes into an alarm sequence to grab additional video frames, which are assembled and then shown as a small "movie" of the alarm occurrence. The so-called movie may be expected to include an image of a subject or subjects who have moved in the disallowed direction. During the alarm occurrence as related to the CPU, horns and strobe lights of the system are activated to signal the alarm occurrence. The horn and strobe alarms may be selectively disabled to permit authorized movement of authorized personnel in the disallowed direction.

The system further includes a video monitoring device or devices, upon which a movie of the alarm event is displayed in continuous loop manner. Optionally, the alarm occurrence may be used to automatically initiate operation of security doors or barriers. For example, in an airport concourse, an alarm occurrence may optionally cause the automatic dropping into place of one or more barriers along a downstream airport concourse, as through use of air-pressure operated doors of previously known type. In this way, the closing of barriers along the concourse can maintain presence of subjects within a concourse as further security procedures, including checking of identity and carry-on luggage, are carried out.

In addition, video camera channels used by the system optionally may be recorded during the occurrence of an alarm event in order to provide a record demonstrating how personnel responded to the alarm. Software operation of the system may not be exited by operating personnel without supervisor intervention. Thus, a supervisor key or other means is provided in the system to allow access to a reset switch or button to be operated by the supervisor.

A further feature of the system is a saturation detector in the form of a video motion detector which is capable of detecting above-normal traffic levels within an exit lane, i.e., and exit path, being monitored by the system. When such above-normal traffic levels are detected, a saturation alarm of the system is activated, indicating that detection zones are too busy, so that the possibility of undetected intrusion is higher than normal. When such a situation exists, horns of the system may be operated with predetermined different tones, and may also cause short duration operation of the strobe lights, with on-screen signaling that security personnel should manually guard the exit being guarded by the system.

The system also includes means for testing components and proper operation of the system.

It is in view of the above problems that the present invention was developed.

BRIEF DESCRIPTION OF THE DRAWINGS

Corresponding reference characters indicate corresponding parts throughout the several views of the drawings.

DETAILED DESCRIPTION OF PRACTICAL EMBODIMENTS

Figure 1:
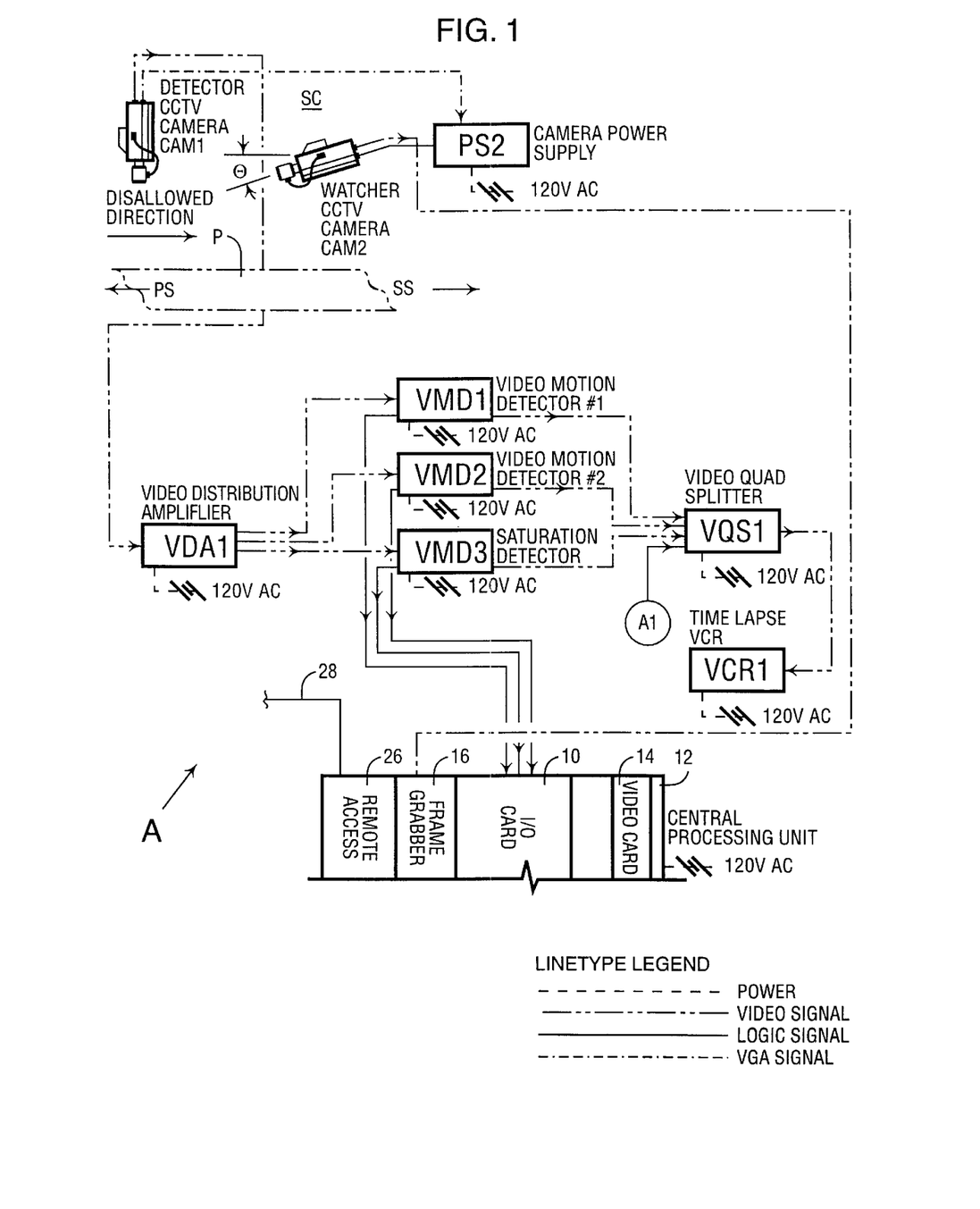
FIG. 1 is a schematic circuit diagram in block form, showing certain principal components of an exit guard system in accordance with and embodying the present invention.
Figure 2:
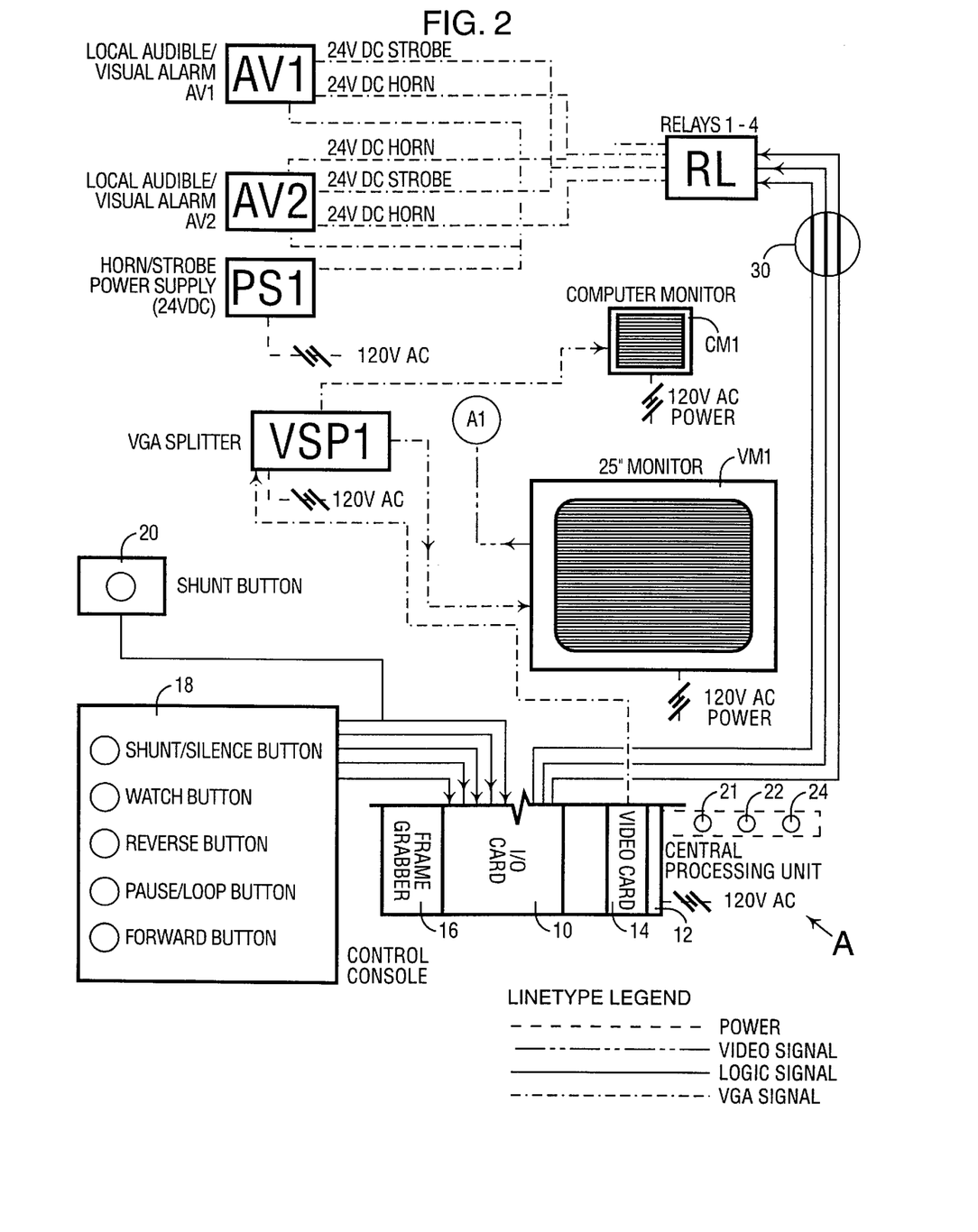
FIG. 2 is another schematic circuit diagram in block form, showing certain alarm, display and control components of the system.

An exit guard system of the present invention is shown generally in FIGS. 1 and 2, and is generally designated A. The system includes a closed circuit television (CCTV) camera CAM1 at a screening checkpoint SC. As is described below, camera CAM1 is associated with video motion detectors VMD1 and VMD2 for monitoring exit lane pedestrian traffic in an exit lane or path P, allowing traffic to travel from a secure side SS of screening checkpoint to a public side PS, but not in the opposite direction, here referred to as the disallowed direction. The secure side SS and public side PS are represented by directions over path P, which is here merely symbolic and may in a given installation be constituted by a corridor, hall, concourse, hallway, or other movement-directing or movement-confining path along which pedestrian traffic is permitted to move in an allowed direction, or what may be termed an exit direction. In the case of an airport security system, the exiting direction is toward the public side PS and away from the secure side SS.

Camera CAM1 is affixed in a suitable manner over path P, which is to say the exit lane, as by installment from ceiling or other overhead position relative to traffic on path P, and most preferably has its optical axis orthogonal to the direction of pedestrian traffic on path P, but other angular orientations may be found suitable.

System A also includes another CCTV camera CAM2 which is aimed at path P at an angle theta to the horizontal, such as about 30 degrees, being pointed generally toward the public side PS and away from the secured side SS. While in a watching mode, system A uses camera CAM2 continuously to grab video frames, always saving the last few seconds of grabbed video frames.

Thus, camera CAM1 is referred to the detector camera; and is primarily used to determine direction of movement of pedestrian traffic on path P. Camera CAM2 is referred to as the watcher camera; it is primarily used to grab video frames showing the image of any subject or object moving on path P in the disallowed direction.

The video output of camera CAM1 is provided to a suitable video distribution amplifier VDA1, from which three outputs are shown, as provided to video motion detectors VMD1, VMD2 and VMD3. These video motion detectors are each of known electronic type as may be specified commercially for the present purposes. Such a video motion detector can be operated to provide an output signal when video input to the device represents movement, as in a predetermined direction which, in this system, is the unauthorized direction.

Video motion detectors VMD1 and VMD2 each provide a movement detection function, providing zoned operation, as will be evident from the description below, while a third video motion detector VMD3 is used to sense whether movement along exit lane or path P, i.e., within the exit lane, is so congested that the capability of any of the video motion detectors is compromised by pedestrian saturation, such that any of the video motion detectors might fail to be able to sense precisely whether any subject is moving in the disallowed direction, and such could occur if there is such pedestrian saturation that the detection zones become so busy that the possibility of undetected intrusion is higher than normal. Together, video motion detectors VMD1–VMD3 provide in effect three zones across the width of the exit lane or path P.

Each of video motion detectors VMD1–VMD3 provides an output to a video quad splitter VQS1 of suitable commercially available type, which in turn may provide its output to a video cassette recorder VCR1, so that any output delivered to VQS1 will enable VCR1 for operation by which images from camera CAM2 are stored as successive time lapse images. A video input A1 to be recorded by VCR1 is provided from the system components shown in FIG. 2.

Each of video motion detectors VMD1–VMD3 is also interconnected with an input/output (I/O) card 10 of a central processing unit (CPU) 12 which also includes a video card 14 and a frame grabber 16, each of suitable commercially available type, and which are controlled by central processing unit 12 under software control evident from the description below. Not shown but optionally present may be the usual keyboard and mouse associated with CPU 12, which may be that of a conventional state-of-art general purpose computer such as of 32-bit IBM type capable of running windowed, object-oriented software.

Figure 3:
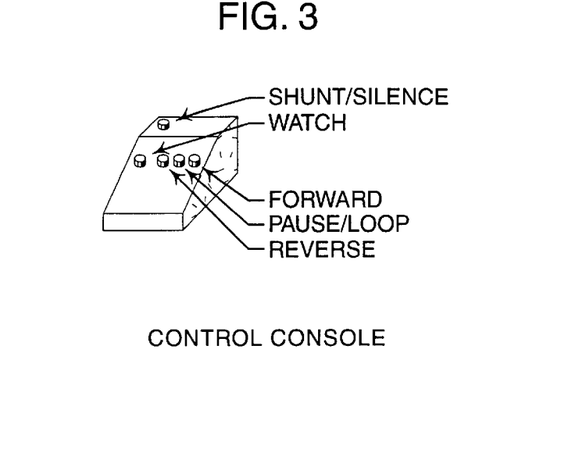
FIG. 3 is a perspective view of a control console of the system.

Referring to FIG. 2, other elements of system A are evident. Here it is seen that I/0 card 10 receives control inputs from a control console, as well as a shunt button 20. Console 18, as shown in FIG. 3 in perspective view, carries control buttons as identified in FIG. 2 by which an authorized operator of system A may provide appropriate control inputs, such as silencing alarm operation upon shunt operation explained below, or may initiate functions such as beginning watch operation of the system, reversal stepping of image display frames, or pause/loop control of image display, as well as forward stepping movement of the image display frames. Shunt button 20 is used to permit an authorized subject, such as security personnel, to move in the unauthorized direction without entry of the system into its normal alarm mode. Display of system functions and any grabbed frames is made possible by a large (e.g., 25 in. diagonal display) video monitor VM1 which receives its video input from a VGA splitter VSP1. The VGA splitter in turn receives its video input from video card 12, and also provides video output to a computer monitor CM1 which may be located conveniently for viewing when setting up and controlling the system or other supervisory use. Video monitor VM1 may be located conveniently for being seen by security personnel, as when the image of a subject moving in the unauthorized direction is detected and begins to be recorded by VCR1. The latter is provided with its video input at A1 as a video output available from monitor VM1.

I/O card 10 also is shown as having a plurality of control outputs 30 provided for controlling the operation of four relays designated collectively as RL, which enable power for operation a first local audible/visual alarm AV1 comprising a strobe light or strobe lights and a horn; and similarly to a second local audible/visual alarm AV2 comprising a strobe light or strobe lights and a horn. These various audible/visual alarm devices are powered by a suitable power supply (e.g., at 24 v.d.c.) by a horn/strobe power supply PS1.

Provision is made for enabling access of the system by modem from a remote location. Referring to FIG. 1, a remote access card or circuit module 26 is included in the system for allowing a telephone or other dedicated line connection 28. Module 26 may include at least one specific commercial or dedicated data modem with appropriate security and access protocols to enable remote dial-in or other remote accessing of the system by an authorized user, so that module 26 permits remote access to the system software or hardware to allow changing of settings, problem or fault detection, monitoring and trouble-shooting. These are illustrative of general capabilities provided by module 26 for remote control, downloading/uploading or reporting as may be required by the system operator(s) or are otherwise useful for implementing intended usage of the system and/or enhancing its reliability.

OPERATION OF THE SYSTEM

In operation of the system, if traffic in the disallowed direction on path P is detected by VMD1 or VMD2 while in the watching mode, a relay contact is closed within VMD1 or VMD2. The relay contact closure is detected by the input/output (I/O) card 10 in the central processing unit (CPU 12). When either of the two video motion detector VMD1 and VMD2 units alarm, the CPU goes into alarm mode. An exit guard software-driven program (herein called the watcher program) goes into alarm sequence and grabs additional video frames from the CCTV camera CAM2. These frames are then assembled and shown as a small "movie" of the alarm, which is displayed by monitors VM1 and CM1. During such an alarm, the horns and strobes AV1 and AV2 are activated. Either of the shunt/silence buttons, namely either button 20 or that on control console 18, can be used to disable the audible signal. However, the visual signals will continue to strobe until the system is reset to watching mode.

The so-called movie of the alarm event will be displayed continuously on both the video monitor VM1 and the computer monitor CM1. This movie will loop continuously. Control console 18 has a pause/loop button which may be used to pause the video loop and return it to looping. While in the paused mode, the forward button and the reverse button may be used to page through the event frame by frame to obtain the best possible view of the subject initiating the alarm. This image will be displayed in full color to speed with identification.

Once the alarm event has been assessed by security personnel, i.e., by a supervisor, the watch button on the control console may be used to return the system to watch mode.

If access through exit lane P is required by airport personnel, the watcher program can be shunted through the use of the shunt/silence button on console 18. The system will chirp the horns of, and activate the strobes of, both AV1 and AV2 while the shunt button is depressed. If the system needs to be disabled for any reason, a hardware shunt can be initiated using another switch symbolized at 21 and located inside the front of an equipment rack holding system components. A supervisor with a key is required to access switch 21. While the system is so shunted, the strobes of both AV1 and AV2 will be active continuously to indicate that the system is not watching the exit lane.

The exit guard watcher program may not be exited by the operating personnel but only by an authorized supervisor.

The watcher system will record the VMD1 and VMD2 camera channels and the output from the video monitor VM1 to show how the personnel responded to the alarm. VCR1 will record 24 hours per video tape.

In the event that a video fault is detected from the video frame-grabbing card 16, the system will initiate the strobes of AV1 and AV2 and display a red warning box on the computer monitor CM1 and video monitor VM1. The system may be reset by use of a reset button located in the front of the equipment rack, and symbolized at 22. A supervisor key is required to access this button. In the event that the shunt switch fails to disable the horns of AV1 and AV2 during an alarm sequence, a horn over ride switch (symbolically shown at 24) is provided within the front of the equipment rack. Operating this switch will silence the horns but will cause the strobes of AV1 and AV2 to operate continuously until the switch is reset to the normal position. A supervisor key is required to access this switch.

When VMD3 saturation detector detects above normal traffic levels within the exit lane, a saturation alarm will be activated. The saturation alarm indicates that the detection zones are too busy and the possibility of undetected intrusion is higher than normal. When this situation exists, the system will operate the horns of AV1 and AV2 with a different tone and also operate the strobes of AV1 and AV2 for a short duration. While in this mode, a normally green message bar indicating "Watching The Exit" displayed at the bottom of the screen, will turn yellow and black, and caused to flash on the monitors. An alarm is still possible while in this state. The on-screen box will read "Manually Guard Exit" to appropriately warn security personnel.

Proper system operation can be tested by use of the three numbered display boxes in the lower left-hand corner of the monitors. To test, the operators should walk through the zone in the disallowed direction. The corresponding zone box will turn red to indicate an alarm in that zone. VMD1 will cause a first box to turn red and VMD2 will cause a second box to turn red. To test the saturation detector, a third box is observed during high traffic times. The third box will flash yellow to indicate the saturation level has been exceeded. A single flash is not enough to initiate a saturation alarm. When a preprogrammed saturation threshold is exceeded, the saturation alarm will occur as described above.

Figure 4:
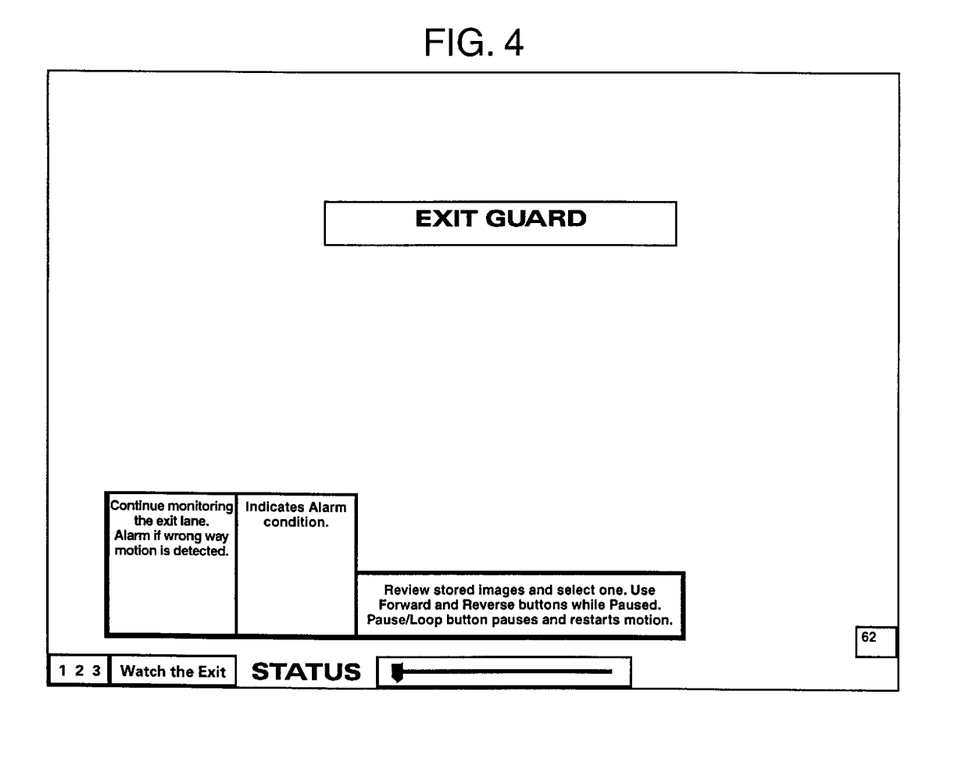
FIG. 4 is a program monitor screen display during system start-up.
Figure 5:
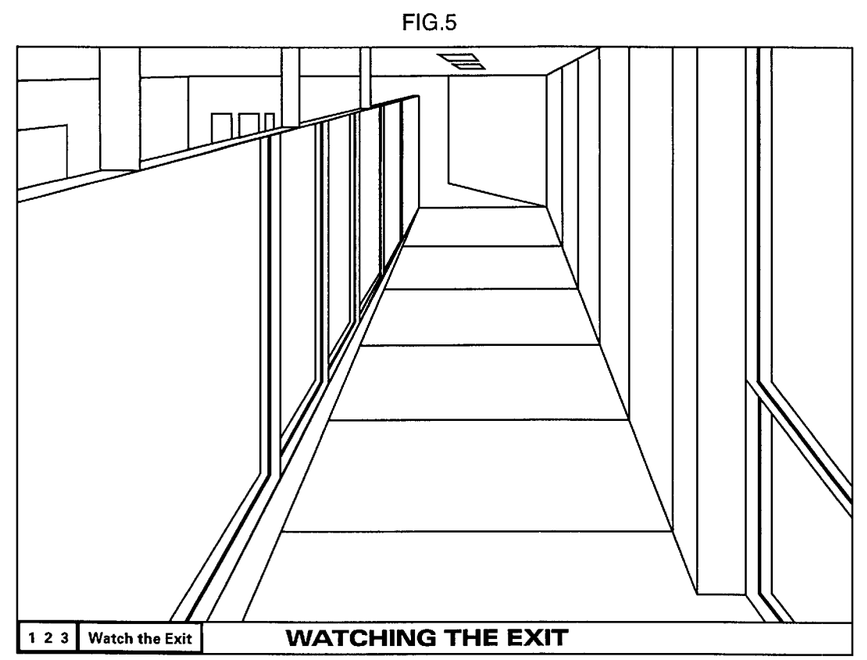
FIG. 5 is a program monitor screen display during system watching mode.

FIG. 4 demonstrates the program monitor screen display during system start-up during which CPU 12 automatically loads the program. The "WATCH" button on control console 18 is pressed. The program now enters an "Exit Watch" mode. Referring to FIG. 5 the program monitor screen display now shows a live picture, as taken by video camera CAM2. A "Watch the Exit" instruction box now appears at the bottom lower left of the screen. To its right, a green display box or strip will appear at the bottom center of the screen with the legend "WATCHING THE EXIT".

Figure 6:
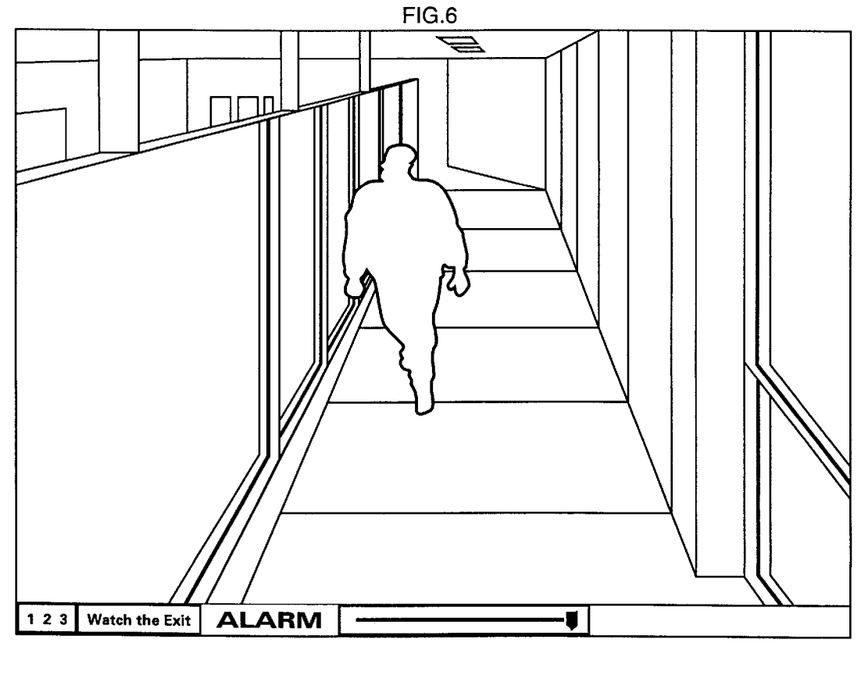
FIG. 6 is a program monitor screen display during an alarm mode.

If then an alarm is registered by the system, such connotes that the video motion detectors have detected movement in the unauthorized direction, so that the program goes into alarm mode, with display as shown in FIG. 6. On the screen, a red box with the word "ALARM" appears to the right of the "Watch the Exit" on-screen display. The audible and visual devices AV1 and AV2 begin to operate. To silence the audible devices, an operator may push the "Shunt/Silence" of console 18. The system now compiles a "video clip movie" of the event as represented by sequentially grabbed frames, and begins to loop (repeat) the so-called movie multiple times on the video monitor screens. An on-screen slider bar appears at the bottom center portion of the monitor screen at the operator's console, showing the progress of the video clip. A red box appears above a slider image device to indicate the first frame of the alarm event. Pressing on the "Pause/Loop" button on the control console will stop the movie on the current frame. The operator can then use the "Forward" or "Reverse" buttons on the control console to page through the movie frame by frame. Pushing the "Pause/Loop" button will start the movie playing continuously. After the event has been evaluated, the system may be put back into watcher mode by pushing the "Watch" button on the control console.

Figure 7:
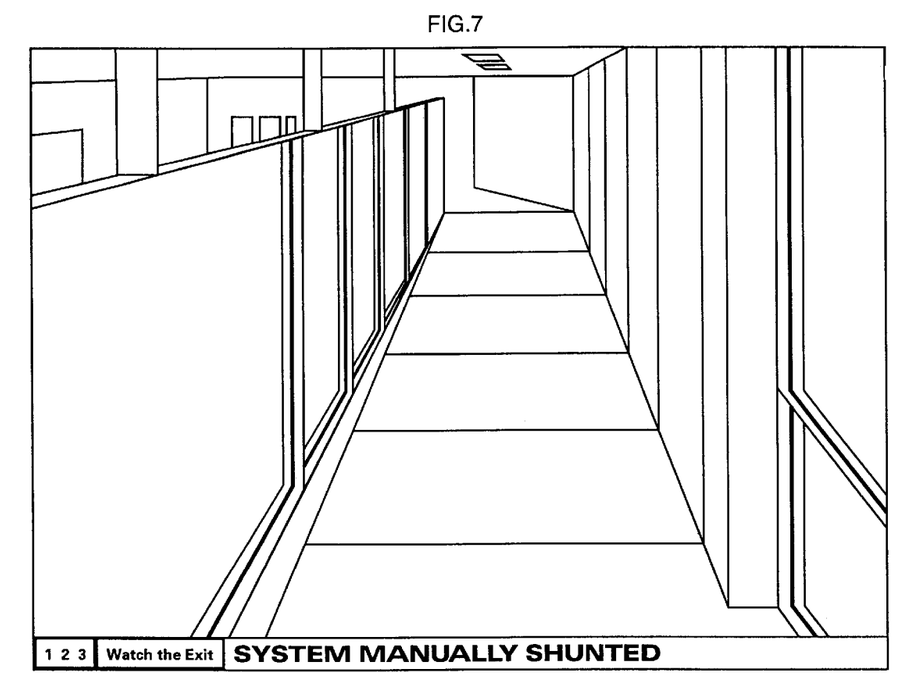
FIG. 7 is a program monitor screen display during an alarm-shunting mode.

Refer next to FIG. 7, which illustrates shunting the alarm. The alarm may be shunted in two different ways. To allow authorized personnel to traverse the exit lane without initiating an alarm, an operator may push and hold the "Shunt/Silence" button on console 18 until the authorized personnel have passed through the alarm zone, that is, along exit path P. The audible devices AV1 and AV2 will chirp once but the strobe lights operate so long as the "Shunt/Silence" button is depressed. While that button is depressed, a green "Watching the Exit" display bar will turn blue and will display the legend "SYSTEM MANUALLY SHUNTED" on program monitor screen display, as shown in FIG. 7, during an alarm-shunting mode. In the event that the system needs to be shunted for a longer period of time, a two-position switch is provided inside the front of the CPU rack (e.g., symbolically represented by switches 21, 22, etc.), preferably with key being required to access such switch. While shunted in this manner, the system acts in the same way as when manually shunted. The audible devices chirp but the visual devices operate continuously until the system is returned to normal watching status.

Figure 8:
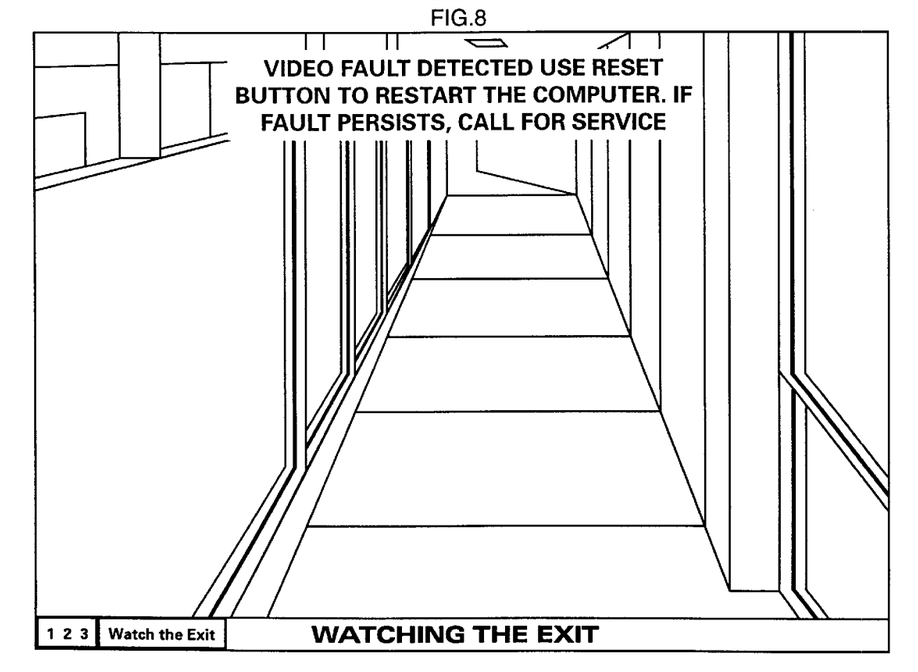
FIG. 8 is a program monitor screen display when a fault mode is detected.

In the event of video or system fault, as shown in by the screen display in FIG. 8, they system activates the visual signals of AV1 and AV2 while putting a red box on the monitor screen display indicating the nature of the fault mode problem, e.g., "VIDEO FAULT DETECTED" to show there is a problem with the camera video.

Resetting the system: If the system needs to be reset for any reason, a "Reset" switch is provided inside of the front of the CPU rack (e.g., symbolically represented by switches 21, 22 etc.), causing the CPU to reboot itself. The system then automatically comes back into the exit guard program.

Audible override: In the unlikely event that the system fails while the audible devices are operating, a hardware audible override is provided to allow manual disconnection of the audible devices. Inside the front cover of the rack is a switch (e.g., symbolically represented by switches 21, 22, etc.) which, when activated, will disconnect the audible devices and initiate the visual devices. The system then may be reset using the "Reset" switch. Once the system reboots and enters the exit guard program, the audible override switch may be returned to its "normal" position.

Saturation alarm operation is as follows: If the system detects, by means of video motion detector VDM3, a saturation of exit lane P, a saturation alarm will occur. The horns of devices AV1 and AV2 chirp in a different tone; and the strobe lights flash temporarily. In the center bottom of the monitor screen, a yellow box appears in flashing mode, reading "Manually Guard Exit". During this state, the exit should be manually guarded because of high traffic. When the saturation situation no longer exists, the system automatically returns to the "Watching the Exit" state. Alarms are still possible during the "Manually Guard Exit" state and should be treated as true alarms.

System testing should entail testing on a daily basis. To test the system, four walk-tests are required, three for the motion detectors VMD1 and VMD2 (tested simultaneously), and one for the saturation detector VMD3. A security supervisor should observe the monitor CM1 while the tests are taking place. In the lower left-hand corner of the display, the screen displays the numbers 1, 2, and 3 on a green background. The tester should walk down one side of the exit lane in both directions, then the middle, and finally the other side. In each pass, the alarm will sound in the unauthorized direction. When the alarm sounds, Zones 1 and 2 will show red backgrounds. Both zones should light (almost simultaneously). To test the saturation zone (Zone 3), two testers should walk side-by-side, in which case the Zone 3 background should turn yellow. The saturation alarm audible/visual signals will not activate, since the minimum programmable saturation time duration required to activate the signals has not been exceeded. Thus, this is not a saturated condition, but only indicates that the zone monitoring is operating correctly.

OPERATION OF THE WATCHER PROGRAM

The watcher program is defined by the following operational modes and effects. The watcher program defines six system states; which are identified as have meanings as follows:

| | |
|---|---|
| Home | Still in home form, yet to start. |
| Watching | Normal operation. |
| Alarm | Alarm detected, not acknowledged. |
| Acknowledged | Operator has responded to alarm. |
| Looping | Finished grabbing frames and now showing. |
| Shunted | Shunt on the alarm - no horn. |

Changes from state to state are made in response to digital inputs from the video motion detectors or operator push buttons of console 18. If so configured, the operator push button functions are available from the usual CPU keyboard and mouse (not shown). The following description is for the system configured for operation without a keyboard.

1. Home

The home state is entered when the program starts. The home screen shows the copyright and help information for controls at the bottom of the monitors. No video is acquired or displayed. Pressing the watch button on the control console while in the home state causes the system to enter the watching state.

2. Watching

In the watching state, video frames are acquired from camera CAM2 (at the rate configured) and displayed on the monitors. Video frames are kept in RAM (up to the number configured), with each new frame replacing the oldest.

While in the watching state, the digital inputs are checked (at the configured frequency) for alarms or shunt inputs.

If an alarm contact closure from VMD1 or VMD2 is detected while in the watching state, the system enters the alarm state.

If a shunt/silence button closure is detected while in the watching state, the system enters the shunted state.

If a saturation alarm is generated while in the watching state due to saturation detections by VMD3, the horns and strobes AV1 and AV2 are energized and a "SATURATION ALARM" label is displayed on the monitors.

The horns and strobes AV1 and AV2 are de-energized when the watch button is closed.

When the saturation alarm is cleared (as determined by the configuration variable) the "SATURATION ALARM" label is removed.

3. Alarm

The horns and strobes AV1 and AV2 are energized when the alarm state is entered.

A red alarm-warning label is displayed on the monitors.

Digital inputs continue to be checked.

If either of the shunt/silence buttons are detected closed, the system state changes to acknowledged.

Video frames from camera CAM2 continue to be acquired, stored and displayed.

After a number of frames (as configured for Frames To Follow Alarm) have been acquired the system state changes to looping.

4. Looping

When the looping state is entered a position slider is displayed on the bottom center of the monitors. The stored frames are displayed in sequence (at the configured playback rate). The slider position indicates the time line of the stored frames. The oldest frame is displayed first, with the slider is positioned at the extreme left. When the alarm frame is displayed, a red "ALARM FRAME" label is displayed above the slider. When the newest frame is displayed, the slider is at the extreme right.

Digital inputs continue to be checked.

If either of the shunt/silence buttons are detected closed, the system state changes to acknowledged.

If the pause/loop button is detected closed while the video frames are being displayed in a continuous loop, the looping restarts.

If the forward button is detected closed while the stored frames are not being displayed in a continuous loop, then the next frame in the sequence is displayed and the slider advances accordingly.

If the reverse button is detected closed while the stored frames are not being displayed in a continuous loop, then the prior frame in the sequence is displayed and the slider reverses accordingly.

If the watch button is detected closed, the program enters the watching state.

5. Acknowledged

When the acknowledged state is entered by closing either of the shunt/silence buttons, the horns AV1 and AV2 are de-energized, but the strobes continue. If the acknowledged state is entered directly from the alarm state (before the looping state) video frames from camera CAM2 continue to be acquired, stored and displayed. After a number of frames (as configured for Frames To Follow Alarm) have been acquired, the state changes to looping.

Digital inputs continue to be checked.

If the pause/loop button is detected closed while the video frames are being displayed in a continuous loop the looping stops, and the last frame displayed stays on the monitors.

If the pause/loop button is detected closed while the video frames are not being displayed in a continuous loop, the looping restarts.

If the Forward button is detected closed while the stored frames are not being displayed in a continuous loop, then the next frame in the sequence is displayed and the slider advances accordingly.

If the Reverse button is detected closed while the stored frames are not being displayed in a continuous loop, then the prior frame in the sequence is displayed and the slider reverses accordingly.

If the watch button is detected closed, the program enters the watching state.

6. Shunted

When the shunted state is entered:

The strobes AV1 and AV2 are energized.
The horns AV1 and AV2 are "chirped" (short pulse).
The "SYSTEM IS SHUNTED" label is displayed on the monitors.

Video frames from camera CAM2 continue to be grabbed and stored as in the watching state.

Digital inputs continue to be checked.

When the shunt button is released, the program returns to the watching state.

When alarm inputs are detected closed, the program does not enter alarm state, but indicator labels on the monitors are turned red to show that the alarm is received

CONFIGURATION VARIABLES

When the program starts, a configuration database is read to determine the value of certain program variables as follows:

Saturation alarm value: Determines how much motion is required to invoke saturation alarm.

Keyboard: True or False, determines if operator input is allowed from a keyboard/mouse.

Debug Out: True or False, determines if debug information is displayed on the monitors.

Alarm Polling Rate: Determines milliseconds between polls of the alarm contacts.

Frames/Second: Determines frames per second to be grabbed while in watching state.

Play Rate: Determines frames per second to be played during the looping state.

Seconds Before: Determines how many seconds of video is saved before alarm input (for looping state).

Seconds After: Determines how many of seconds of video are to be grabbed after alarm receipt before starting looping.

The foregoing is illustrative of the software modes and definitions, and thus can enable those skilled in the art to provide the necessary software functions.

In view of the foregoing description of the present invention and preferred apparatus and method embodiments it will be seen that the several objects of the invention are achieved and other advantages are attained.

As various modifications could be made in the apparatus and methods herein described and illustrated without departing from the scope of the invention, it is intended that all matter contained in the foregoing description or shown in the accompanying drawings shall be interpreted as illustrative rather than limiting.

For example, the term software or software program as used for describing the system software which defines the exit guard program is used to connote any of software, hardware or firmware including memory devices including RAM, ROM, PROM and other types of such devices by which the exit guard program is stored, written, or accessed.

Thus, the breadth and scope of the present invention should not be limited by any of the above-described exemplary embodiments, but should be defined only in accordance with the following claims appended hereto and their equivalents.

What is claimed is:

1. An exit guard system for automatically detecting movement of a subject along an exit path in an unauthorized direction, comprising at least one video camera positioned for video imaging of at least a portion of the exit path, at least one video motion detector operating in conjunction with the video camera, by which the video camera monitors exit lane pedestrian traffic, a central processing unit interconnected with the video motion detector, the central processing unit operating under an exit guard software program to provide a watching mode, during which video frames of pedestrian traffic in and along the path are continuously grabbed and saved, and audible and/or visual alarm signaling devices, wherein the detection of the subject along the exit path in the unauthorized direction is made by the video motion detector and causes the central processing unit to enter an alarm mode in which it causes the audible and/or visual alarm signaling devices to signal such unauthorized direction movement, a video monitor for displaying modes of operation of the system, and control devices for allowing selection and control of modes of operation of the system.

2. A system as set forth in claim 1 including a video frame grabber controlled by the central processing unit such that, during alarm mode occurrence, at least the last few seconds of video frames are saved, and are caused to be displayed by the video monitor in cyclic looping intervals of several seconds in duration as, in effect, a movie of sequentially grabbed frames.

3. A system as set forth in claim 2 further comprising a saturation detector capable of detecting above-normal pedestrian traffic levels within the path, the exit lane, i.e., and exit path, being monitored by the camera, the saturation detector operating such that when above-normal traffic levels are detected, a saturation alarm of the system is activated, indicating that detection zones are too busy, so that the possibility of undetected intrusion is higher than normal.

4. A system as set forth in claim 3 wherein the exit guard program provides function states including a home state in which the system is yet to start watching the exit path, a watching state in which the exit path is watched for movement in the unauthorized direction, an alarm state in which there is detection of movement in the unauthorized direction, an acknowledged state in which an operator has acknowledged the alarm state by responding to an alarm, a looping state in which grabbed frames are displayed on the video monitor, and a shunted state in which operation of the alarm signaling devices are altered to signify the shunted state, the shunted state permitting movement of an authorized subject in the unauthorized direction.

5. A system as set forth in claim 4 wherein a first video camera images a subject moving in the exit lane in the unauthorized direction by imaging along an axis inclined relative to horizontal, and whereby provides an image of the subject for identification purposes, and a second video camera over the exit lane images a subject moving in the exit lane in the unauthorized direction by imaging along an axis orthogonal to horizontal and whereby is responsive to the direction of movement of the subject.

6. An exit guard system for automatically detecting movement of a subject along an exit path in an unauthorized direction, comprising a first video camera positioned for video imaging of at least a portion of the exit path to image movement of pedestrian subjects along the path, a second video camera positioned for video imaging of the pedestrian subjects for identification, a plurality of video motion detectors operating in conjunction with the first video camera, wherein the detection of the subject along the exit path in the unauthorized direction is made by the video motion detectors, a central processing unit interconnected with the video motion detectors, the central processing unit operating under an exit guard software program to provide a watching mode, during which frames of the second video camera are continuously grabbed and saved, and audible and/or visual alarm signaling devices, the video motion detectors being responsive to pedestrian traffic in the unauthorized direction and causing the central processing unit to enter an alarm mode in which it causes the audible and/or visual alarm signaling devices to signal such unauthorized direction movement, a video monitor for displaying modes of operation of the system, and control devices for allowing selection and control of modes of operation of the system.

7. A system as set forth in claim 6 including a video frame grabber controlled by the central processing unit such that, during alarm mode occurrence, at least the last few seconds of video frames are saved, and are caused to be displayed by the video monitor in cyclic looping intervals of several seconds in duration as, in effect, a movie of sequentially grabbed frames.

8. A system as set forth in claim 7 further comprising a saturation detector capable of detecting above-normal pedestrian traffic levels within the path as monitored by the first video camera, the saturation detector comprising a further video motion detector and the saturation detector operating such that when above-normal traffic levels are detected, a saturation alarm of the system is activated, indicating that detection zones are too busy, so that the possibility of undetected intrusion is higher than normal.

9. A system as set forth in claim 4 wherein the first video camera is mounted over the exit lane for imaging movement in the exit lane in the unauthorized direction by imaging along an axis orthogonal to horizontal and whereby is responsive to the direction of movement of the subject the second video camera images a subject moving in the exit lane in the unauthorized direction by imaging along an axis inclined relative to horizontal, and whereby provides an image of the subject for identification purposes.

10. A system as set forth in claim 1 and further comprising a remote access circuitry for allowing a telephone or other dedicated line connection to the system, the remote access circuitry including at least one dedicated data modem with appropriate security and access protocols to permit remote dial-in or other remote accessing of the system by an authorized user, so as to enable remote access to system software or hardware for remote control, downloading/ uploading or reporting as may be required by system operator(s) or for purposes otherwise useful for implementing intended usage of the system and/or enhancing its reliability.

11. A guard system for automatically detecting movement of a subject along a path in an unauthorized direction, comprising at least one video camera positioned for video imaging of at least a portion of the path, at least one video motion detector operating in conjunction with the video camera, by which the video camera monitors lane traffic, a central processing unit interconnected with the video motion detector, the central processing unit operating under a guard program to provide a watching mode, during which video frames of a subject along the path are continuously grabbed and saved, and at least one alarm signaling device, wherein the detection of the subject along the exit path in the unauthorized direction is made by the video motion detector and causes the central processing unit to enter an alarm mode in which it causes the alarm signaling device to signal such unauthorized direction movement, and at least one video monitor for displaying at least the image of the subject moving in the unauthorized direction, and control devices for allowing control of operation of the system.

12. A method of guarding a path for unauthorized direction of movement along the path by automatically detecting movement of a subject along the path in the unauthorized direction, comprising positioning a first video camera for video imaging of at least a portion of the path to image movement of a subject along the path in an unauthorized direction, positioning a second video camera for video imaging of the a subject for identification during movement in the unauthorized direction, and operating video motion detector means in conjunction with the first video camera, wherein the detection of the subject along the path in the unauthorized direction is made by the video motion detector means, and using a central processing unit interconnected with the video motion detector means while operating the central processing unit under a guard program to provide a watching mode, during which frames of the second video camera are continuously grabbed and saved, and causing the video motion detector to respond to traffic of a subject in the unauthorized direction such that the central processing unit is caused to enter an alarm mode signaling movement of the subject in the unauthorized direction, and actuating during said alarm mode audible and/or visual alarm signaling devices to signal such unauthorized direction movement, while using a video monitor to display modes of operation of the system and using control devices for allowing selection and control of modes of operation of the system.

13. A method as set forth in claim 12 including operating the guard program to provide function states including a home state in which there is readiness to start watching the path, a watching state in which the path is watched for movement in the unauthorized direction, an alarm state in which there is detection of movement in the unauthorized direction, an acknowledged state in which an operator has acknowledged the alarm state by responding to an alarm, a looping state in which grabbed frames are displayed on the video monitor, and a shunted state in which operation of the alarm signaling devices are altered to signify the shunted state, the shunted state permitting movement of an authorized subject in the unauthorized direction.

14. A method as set forth in claim 12 including using remote access circuitry for allowing a telephone or other dedicated line connection including a data modem with appropriate security and access protocols to enable remote dial-in or other remote accessing of the system by an authorized user, so as to permit remote access to system software or hardware to allow changing of settings, problem or fault detection, monitoring and trouble-shooting, as well as such other remote control, downloading/uploading or reporting as may be required by system operator(s) or may otherwise be useful for implementing intended usage of the system and/or enhancing its reliability.

15. A system as set forth in claim 6 and further comprising a remote access circuitry for allowing a telephone or other dedicated line connection to the system, the remote access circuitry including at least one dedicated data modem with appropriate security and access protocols to permit remote dial-in or other remote accessing of the system by an authorized user, so as to enable remote access to system software or hardware for remote control, downloading/ uploading or reporting as may be required by system operator(s) or for purposes otherwise useful for implementing intended usage of the system and/or enhancing its reliability.

\* \* \* \* \*